No. 882,344. PATENTED MAR. 17, 1908.
J. B. RHODES.
ARTIFICIAL BAIT.
APPLICATION FILED SEPT. 15, 1905.

Witnesses: Inventor,
E. Marie Jackson. Jay B. Rhodes
Ethel A. Bradford By Chappell & Earl
 Att'ys

UNITED STATES PATENT OFFICE.

JAY B. RHODES, OF KALAMAZOO, MICHIGAN, ASSIGNOR TO WILLIAM SHAKESPEARE, JR., OF KALAMAZOO, MICHIGAN.

ARTIFICIAL BAIT.

No. 882,344.  Specification of Letters Patent.  Patented March 17, 1908.

Application filed September 15, 1905. Serial No. 278,682.

*To all whom it may concern:*

Be it known that I, JAY B. RHODES, a citizen of the United States, residing at Kalamazoo, in the county of Kalamazoo and State of Michigan, have invented certain new and useful Improvements in Artificial Bait, of which the following is a specification.

This invention relates to improvements in fishing baits or lures.

It relates particularly to artificial baits or lures designed to imitate natural or live bait, such as shown in my application for Letters Patent filed December 5, 1904, Serial Number 235,570, and is a modification and in some respects an improvement upon the structure there shown.

The objects of my invention are, first, to provide an improved bait or lure which when in the water very closely resembles a natural or live bait. Second, to provide an improved "weedless" artificial bait or lure. Third, to provide an improved artificial bait or lure in which the hooks are arranged in a manner to render them very effective. Fourth, to provide an improved bait or lure in which the hooks are arranged in such a manner that they serve to keep the bait right side up when the same is in the water.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which—

Figure 1:
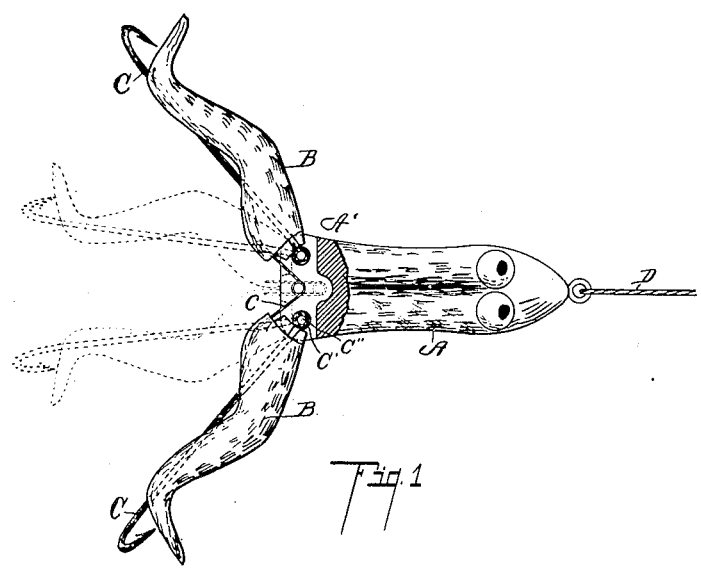
Figure 2:
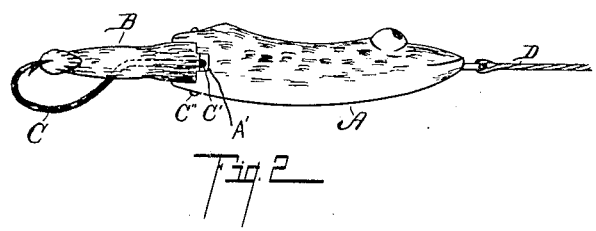

Figure 1 is a plan of my improved bait or lure, portions being broken away to show structural details, the rear position of the legs being indicated by dotted lines. Fig. 2 is a side elevation view of my improved bait or lure.

In the drawing similar letters of reference refer to similar parts in both views.

Referring to the drawing, the body A is preferably made in imitation of a frog. The rear end of the body is preferably slotted horizontally at A' to receive the hooks and the forward ends of the legs. The legs B are preferably carried by the hooks C, the shanks of the hooks being arranged through the inner ends of the legs. The body and the legs are preferably made of rubber, and the legs are preferably secured to the hooks by molding the same thereon. The hooks are secured to the body by pivots C'' which are arranged through the eyes C' thereof. By this arrangement the hooks and the legs are both secured by the same pivots and they are kept in proper relation to each other. The legs are held normally or yieldingly outward or extended by the spring c. This spring is preferably V-shaped, the apex projecting into the slot A' and the arms being secured to the legs, as clearly appears from the drawing.

When the bait is in the water, a pull upon the line, as D, will throw the legs backward, as is illustrated by dotted lines in Fig. 1, the pressure of the water overcoming the tension of the spring. When the line is again slackened the spring forces the legs outward or extended to their initial position. This movement gives the bait a very natural appearance, and by a succession of pulls on the line the bait may be given the appearance of and a movement very similar to that of a swimming frog.

The hooks and legs are so arranged that the feet lie in front of the points of the hooks, forming weed guards therefor. The hooks are arranged with the curve of the shanks downward so that their points are brought into position for receiving a strike. When the hooks are thus arranged they also serve as weights to keep the bait in an upright position. Being placed at the rear of the bait they also give it the proper inclination when in the water.

I preferably form the body and the legs of rubber. The legs, being somewhat elastic, do not in any way prevent the hooks from properly engaging when struck by a fish. The hooks, lying close to the legs, are in the most effective position, as a fish will usually aim for the legs of a frog in making a strike.

It is evident that the legs can be secured directly to the body instead of to the hooks, and that the hooks might be carried by the legs; or they might be independently connected to the body. I have illustrated a simple form of the spring to throw the legs normally outward or extended; it is evident, however, that there are a great variety of means for doing this. As such variations will readily appear to those skilled in the art to which this invention relates, I do not attempt to illustrate or describe them herein.

I have illustrated and described my improved bait or lure in detail in the form preferred by me on account of its structural simplicity and economy, although I am aware that it is capable of very great structural variation without departing from my invention.

Having thus described my invention, what I claim as new and desire to secure by Letters Patent, is:

1. In an artificial bait or lure, the combination of a body having a horizontal slot in its rear end; hooks provided with eyes arranged in said slot with their points upward; legs arranged in said slot upon the shanks of said hooks, so that the points of the hooks are guarded thereby; pivot pins arranged through the eyes of the hooks for securing them to the body; and a forwardly pointing V-shaped spring engaging said legs for holding them normally outward, arranged in said slot in said body, for the purpose specified.

2. In an artificial bait or lure, the combination of a body; hooks provided with eyes, arranged with their points upward; legs arranged upon the shanks of said hooks, so that the points of the hooks are guarded thereby; pivot pins arranged through the eyes of the hooks for securing them to the body; and a forwardly pointing V-shaped spring engaging said legs for holding them normally outward, for the purpose specified.

3. In an artificial bait or lure, the combination of a body having a horizontal slot in its rear end; hooks provided with eyes; legs arranged in said slot upon the shanks of said hooks, so that the points of the hooks are guarded thereby; pivot pins arranged through the eyes of the hooks for securing them to the body; and a forwardly pointing V-shaped spring engaging said legs for holding them normally outward, arranged in said slot in said body, for the purpose specified.

4. In an artificial bait or lure, the combination of a body; hooks provided with eyes; legs arranged upon the shanks of said hooks, so that the points of the hooks are guarded thereby; pivot pins arranged through the eyes of the hooks for securing them to the body; and a forwardly pointing V-shaped spring engaging said legs for holding them normally outward, for the purpose specified.

5. In an artificial bait or lure, the combination of a body having a horizontal slot in its rear end; hooks arranged in said slot with their points upward; legs arranged in said slot upon the shanks of said hooks, so that the points of the hooks are guarded thereby; pivot pins arranged through the eyes of the hooks for securing them to the body; and means for holding said legs normally outward, for the purpose specified.

6. In an artificial bait or lure, the combination of a body; hooks provided with eyes arranged with their points upward; legs arranged upon the shanks of said hooks, so that the points of the hooks are guarded thereby; pivot pins arranged through the eyes of the hooks for securing them to the body; and means for holding said legs normally outward, for the purpose specified.

7. In an artificial bait or lure, the combination of a body having a horizontal slot in its rear end; hooks provided with eyes; legs arranged in said slot upon the shanks of said hooks, so that the points of the hooks are guarded thereby; pivot pins arranged through the eyes of the hooks for securing them to the body; and means for holding said legs normally outward, for the purpose specified.

8. In an artificial bait or lure, the combination of a body; hooks provided with eyes; legs arranged upon the shanks of said hooks, so that the points of the hooks are guarded thereby; pivot pins arranged through the eyes of the hooks, for securing them to the body; and means for holding said legs normally outward, for the purpose specified.

9. In an artificial bait or lure, the combination of a body, having a horizontal slot in its rear end; hooks provided with eyes arranged in said slot with their points upward; legs arranged in said slot upon the shanks of said hooks, so that the points of the hooks are guarded thereby; and pivot pins arranged through the eyes of the hooks for securing them to the body, for the purpose specified.

10. In an artificial bait or lure, the combination of a body; hooks provided with eyes arranged with their points upward; legs arranged upon the shanks of said hooks, so that the points of the hooks are guarded thereby; and pivot pins arranged through the eyes of the hooks for securing them to the body, for the purpose specified.

11. In an artificial bait or lure, the combination of a body, having a horizontal slot in its rear end; hooks provided with eyes; legs arranged in said slot, upon the shanks of said hooks, so that the points of the hooks are guarded thereby; and pivot pins arranged through the eyes of the hooks for securing them to the body, for the purpose specified.

12. In an artificial bait or lure, the combination of a body; hooks provided with eyes; legs arranged upon the shanks of said hooks, so that the points of the hooks are guarded thereby; and pivot pins arranged through the eyes of the hooks for securing them to the body; for the purpose specified.

13. In an artificial bait or lure, the combination of a body; hooks arranged with their points upward; legs arranged so that the points of the hooks are guarded thereby; and means for holding said legs yieldingly in position, for the purpose specified.

14. In an artificial bait or lure, the combination with the body, of hooks carried by said body; and legs for said body arranged so that their outer ends lie normally in front of and out of contact with the point of the hooks so that the hooks are guarded thereby, for the purpose specified.

15. In a bait or lure, the combination of a body; legs therefor; means for holding said legs yieldingly in position; hooks arranged so that said legs serve as guards therefor; and connections for said legs and hooks for maintaining their proper relation, for the purpose specified.

16. In a bait or lure, the combination of the body; a movable member therefor; means for holding said movable member yieldingly in position; a hook pivotally secured to said body arranged so that said movable member serves as a guard for the point thereof; and connections for said movable member and hook for maintaining their proper relation during the movement of the said movable member, for the purpose specified.

17. In a bait or lure, the combination of a body; a movable member hinged to said body; means for holding the free end of said movable member yieldingly out from said body; and a fishing line connected to said body, whereby a swimming movement may be imparted to said movable member by the manipulation of the line, as specified.

In witness whereof, I have hereunto set my hand and seal in the presence of two witnesses.

JAY B. RHODES. [L. S.]

Witnesses:
  OTIS A. EARL,
  A. J. ALBER.